United States Patent [19]
Hayashi

[11] Patent Number: 5,144,475
[45] Date of Patent: Sep. 1, 1992

[54] OBJECTIVE LENS SYSTEM FOR USE WITHIN MICROSCOPE

[75] Inventor: Takahisa Hayashi, Kyoto, Japan

[73] Assignee: Dainippon Screen Mfg. Co., Ltd., Japan

[21] Appl. No.: 672,472

[22] Filed: Mar. 20, 1991

[30] Foreign Application Priority Data

Mar. 23, 1990 [JP] Japan .................. 2-74298
Apr. 24, 1990 [JP] Japan .................. 2-109848

[51] Int. Cl.$^5$ .............................................. G02B 21/16
[52] U.S. Cl. .................. 359/355; 359/350; 359/658; 359/659
[58] Field of Search ......... 359/350, 355, 658, 659, 359/756, 761, 763, 764, 766

[56] References Cited

U.S. PATENT DOCUMENTS

| | | | |
|---|---|---|---|
| 4,283,123 | 8/1981 | Tojyo | 359/659 |
| 4,461,546 | 7/1984 | Muffoletto et al. | 359/355 |
| 4,770,477 | 9/1988 | Shafer | 359/355 |

Primary Examiner—Rodney B. Bovernick
Assistant Examiner—J. P. Ryan
Attorney, Agent, or Firm—Ostrolenk, Faber, Gerb & Soffen

[57] ABSTRACT

An objective lens system for use within a microscope includes six lenses which are spaced apart from an object side. The first, the third and the fifth lenses are made of quartz, the fourth and the sixth lenses are made of fluorite, while the second lens is made of either quartz or fluorite. The system transmits ultraviolet and-/or far ultraviolet light is simply constructed and corrects chromatic aberration.

9 Claims, 11 Drawing Sheets

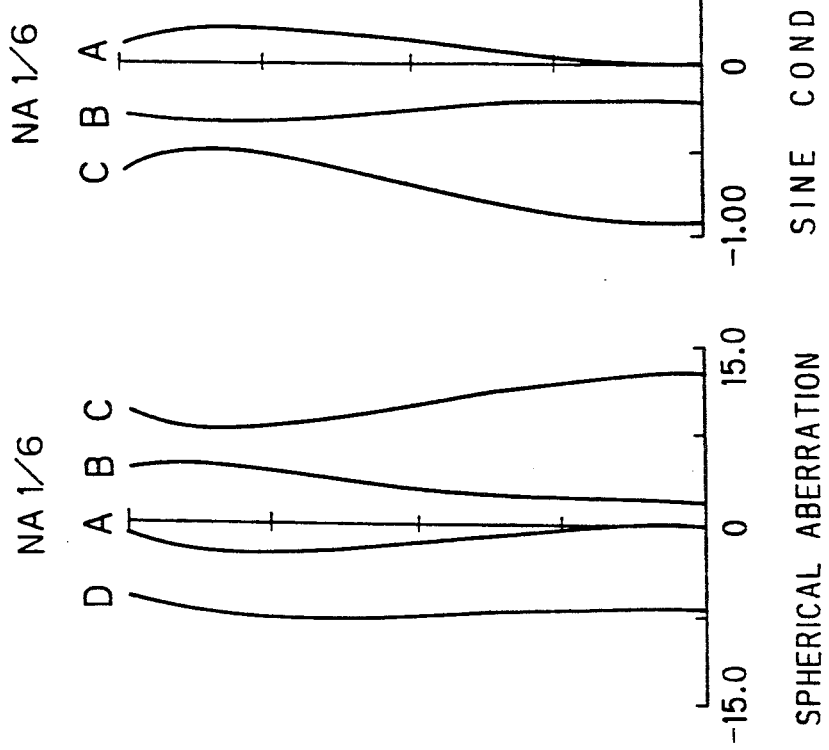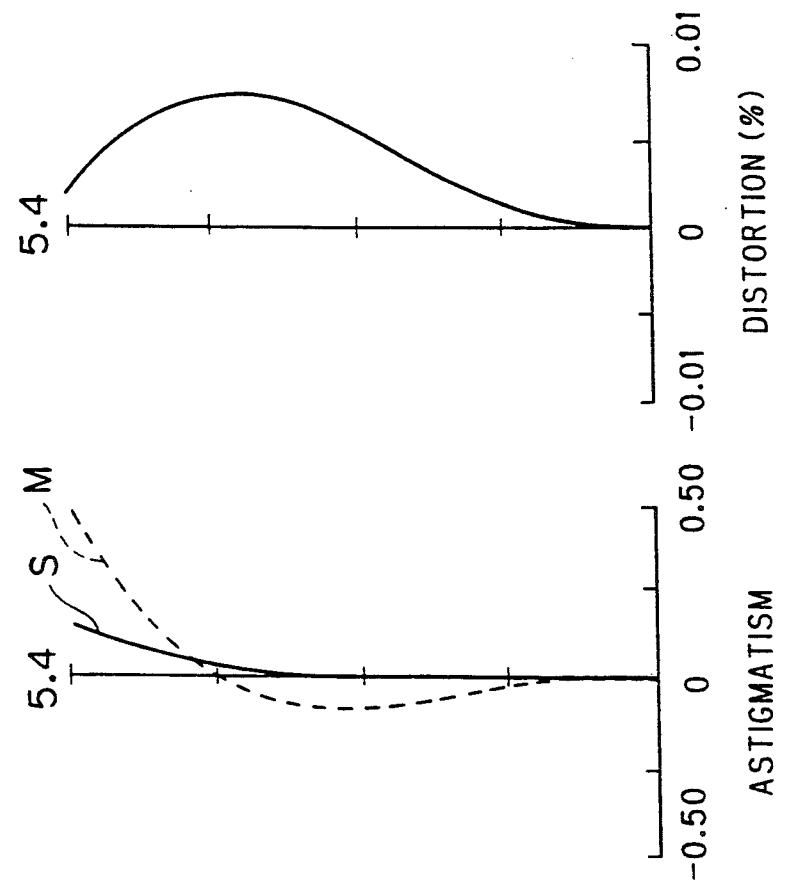

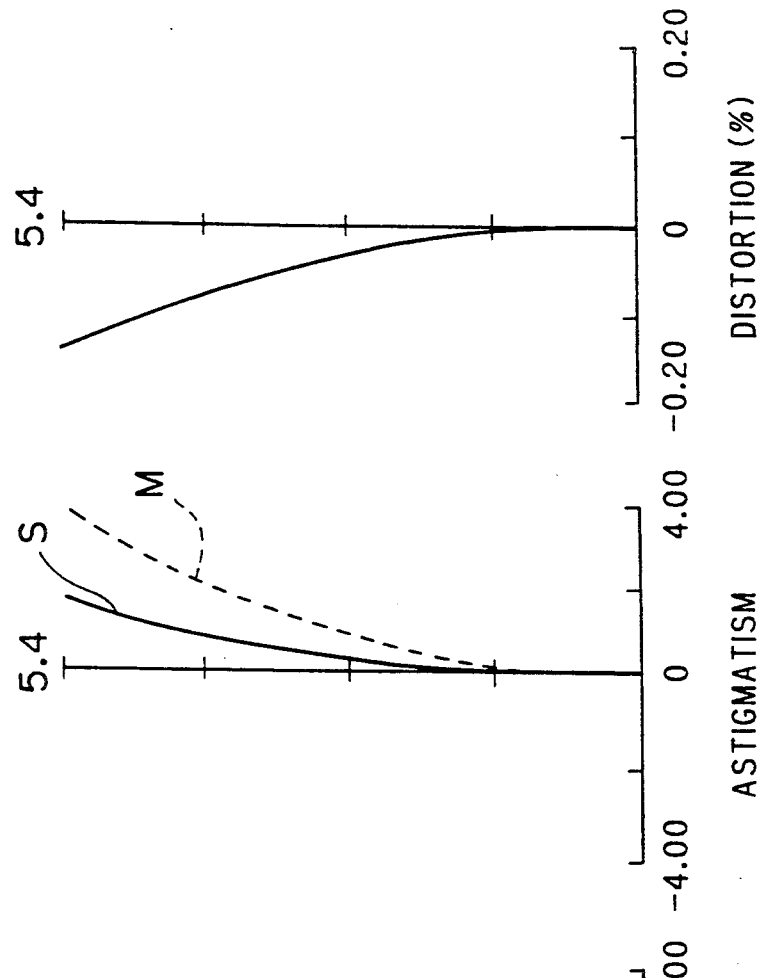
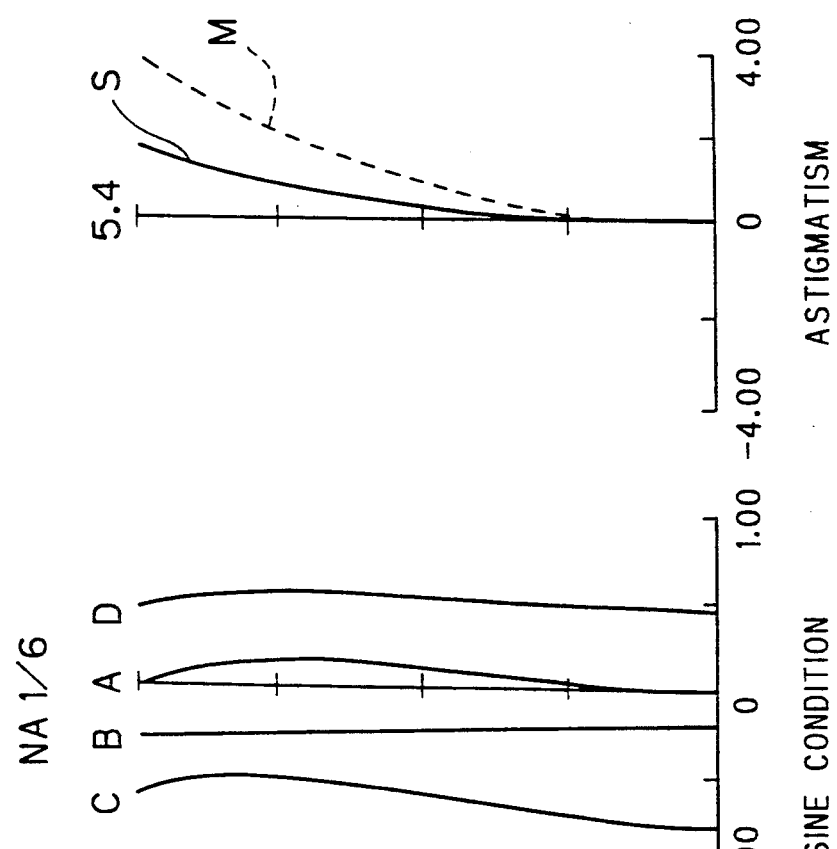
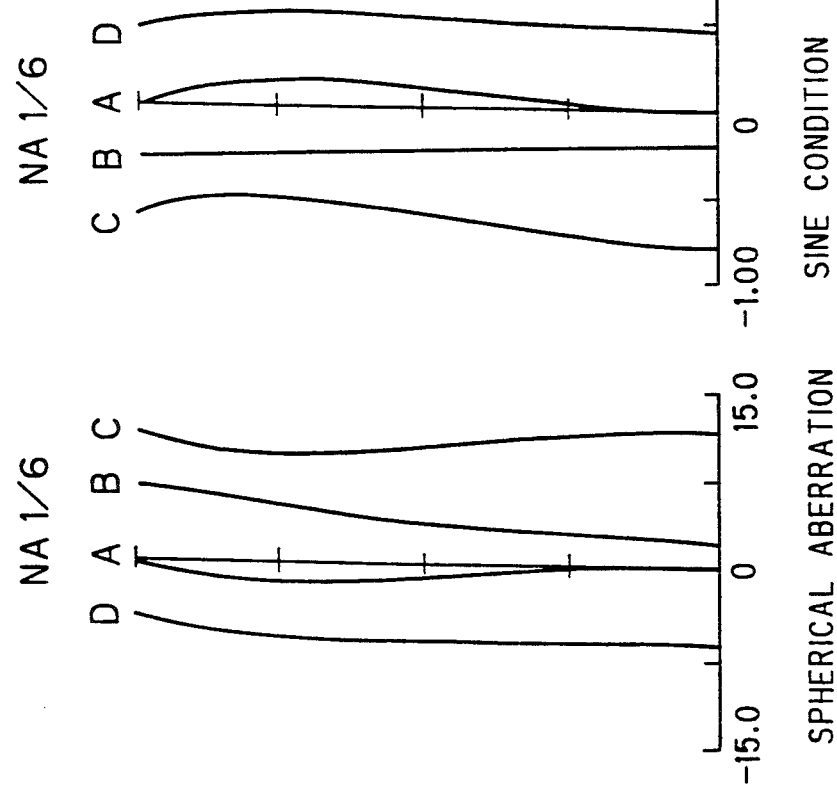

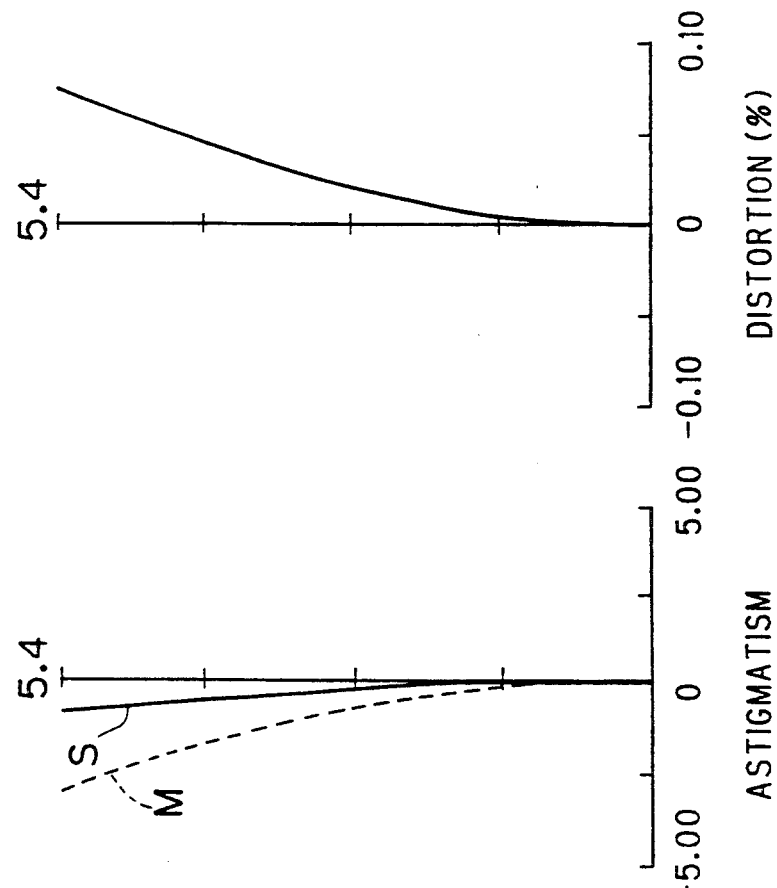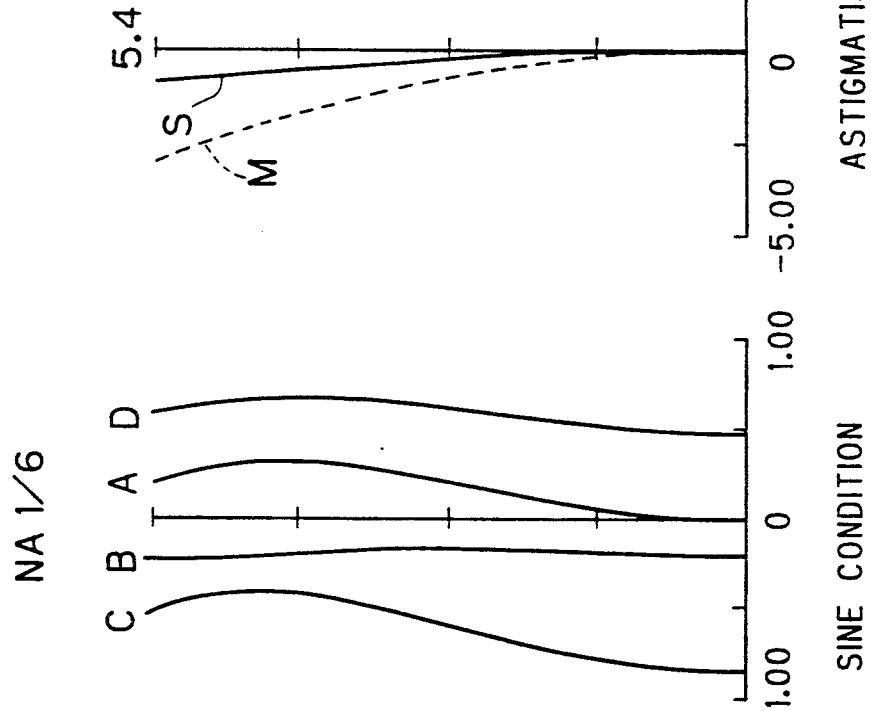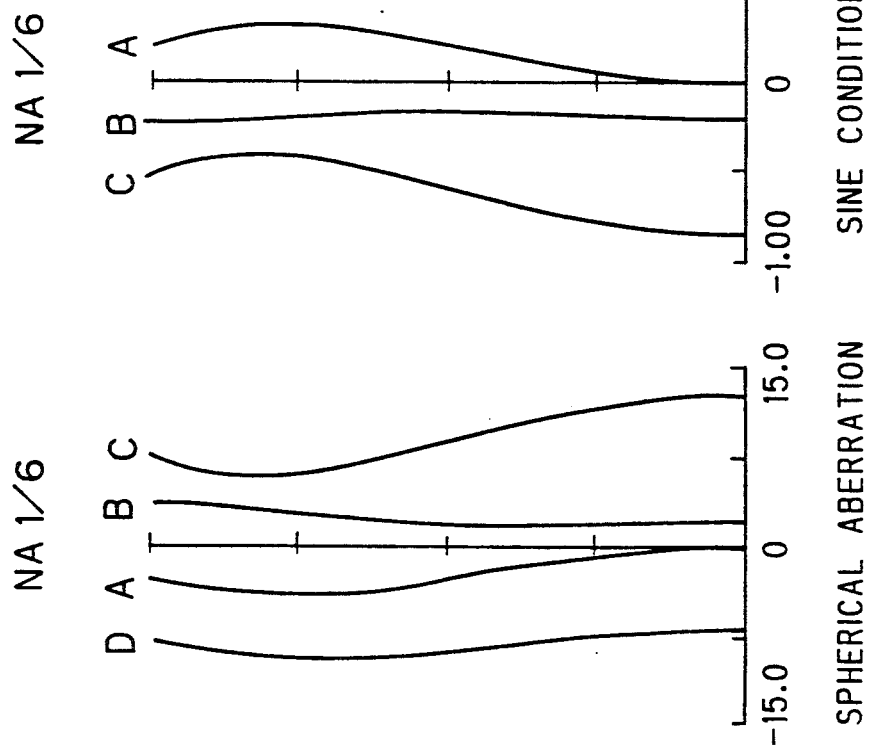

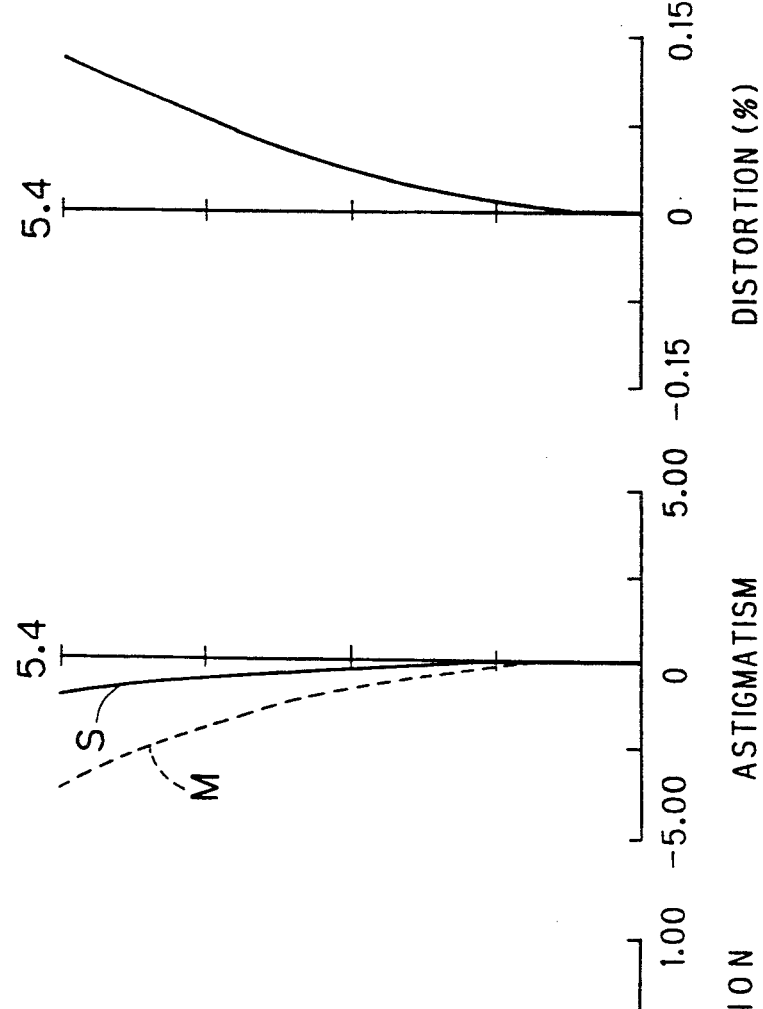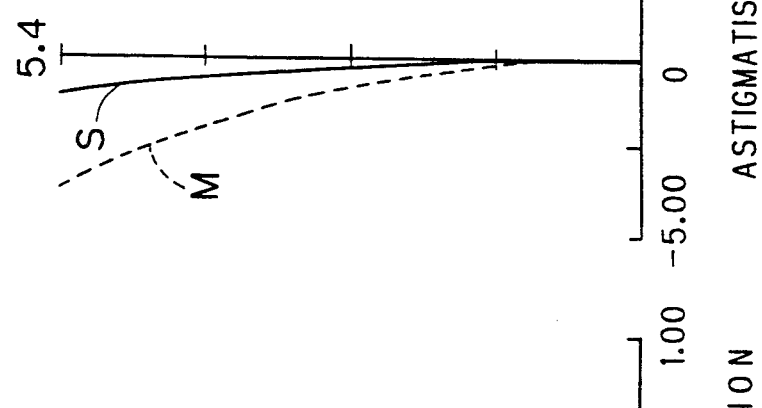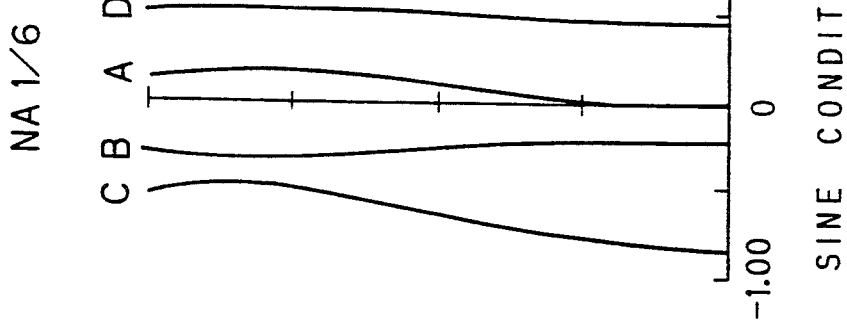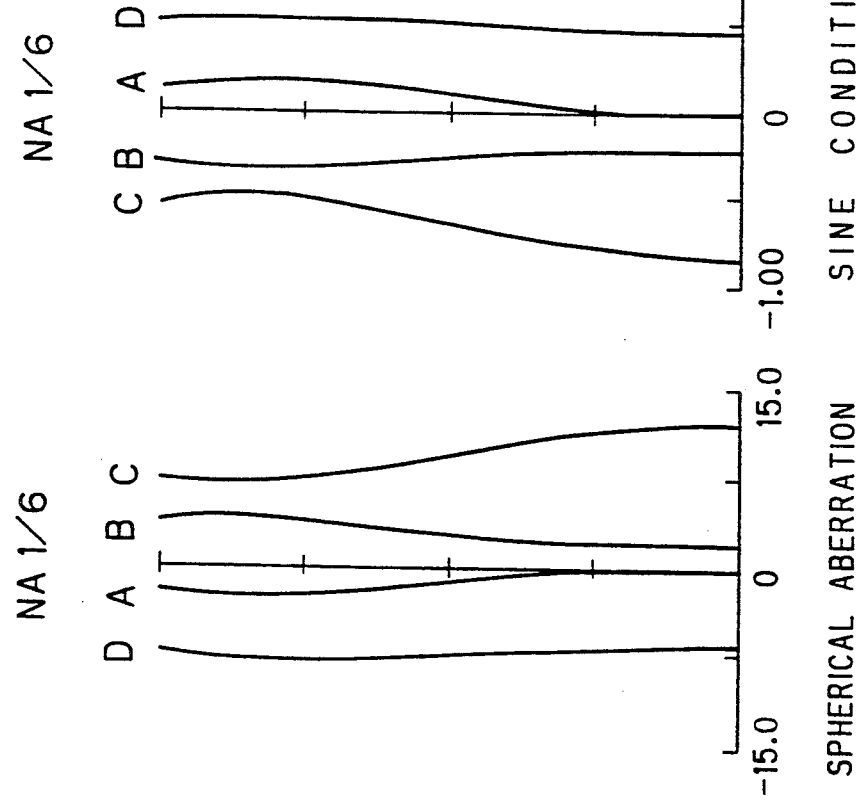

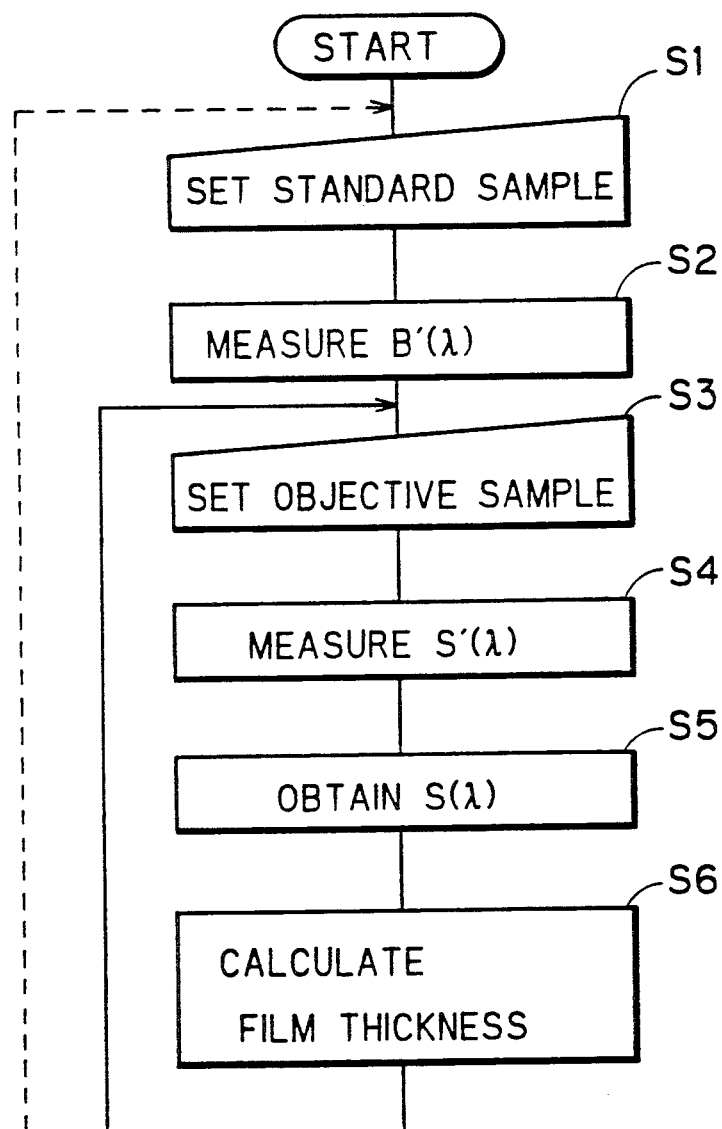

1

OBJECTIVE LENS SYSTEM FOR USE WITHIN MICROSCOPE

BACKGROUND OF THE INVENTION

1. Field of the Invention

The present invention relates to an objective lens system for use within a microscope which is operable in ultraviolet range, in the particular, in far ultraviolet range, in which light has a wavelength of shorter than 300 nm.

2. Description of the Background Art

It is commonly known in the art that a microscope has the property that, assuming that the numerical aperture (NA) of an objective lens system used within microscope remains constant, the shorter a wavelength of light, the better the resolution. Thus, it is possible to observe a sample in greater detail by shortening the wavelength of the illumination light. In addition, illuminating a sample with ultraviolet light would often result in fluorecence of stronger intensity being discharged from a sample than fluorecence obtained by illuminating with visible light. Against this backdrop, a microscope operable in ultraviolet range is preferred in the art, because more information is obtained by observing a sample through such a microscope. Thus, an objective lens system for use within a microscope must be operable in the ultraviolet and/or far ultraviolet range.

Among known conventional objective lens systems which are operable in ultraviolet and/or far ultraviolet range is, for example, an objective lens system for use within a microscope described in "Hikari Gijyutsu Contact," Volume 25, Number 2, Page 137 (Feb 1987). That objective lens system is illustrated in FIG. 1.

In FIG. 1, an objective lens system 70 includes a first lens 71 made of fluorite, a second lens group 72 and a third lens group 73, disposed in that order from an object side (left-hand side of the figure) to an image formation side (right-hand side of the figure). The second lens group 72 includes two convex lenses 72b and 72c both made of fluorite and a concave lens 72a made of quartz. The second lens group 72 is formed by holding the concave lens 72a between the convex lenses 72b and 72c and joining the same to each other. The third lens group 73 is formed, in a similar manner to the second lens group 72, by holding a concave lens 73a made of quartz between two convex lenses 73b and 73c both made of fluorite and joining the same to each other.

Since the lenses 71, 72a to 72c and 73a to 73c are made of either quartz or fluorite, the objective lens system 70 is capable of transmitting ultraviolet and/or far ultraviolet light, and is hence, operable in the ultraviolet and/or far ultraviolet range.

In addition to this, chromatic aberration can be corrected in the objective lens system 70, since the second lens group 72 is composed of the concave lens 72a made of quartz and the convex lenses 72b and 72c made of fluorite while the third lens group 73 is composed of the concave lens 73a made of quartz and the convex lenses 73b and 73c made of fluorite.

The convex lens 72b, the concave lens 72a and the convex lens 72c of the second lens group 72 are brought into optical contact and joined to each other. Similarly in the third lens group 73, the convex lens 73b, the concave lens 73a and the convex lens 73c are brought into optical contact thereby to be joined to each other. This is attributable to the current technical level which has not as yet been able to provide adhesive which transmits far ultraviolet light. Further, when a junction surface between lenses has to completely eliminate reflection thereat, there is no option other than cementing by optical contact. Thus, in the process of manufacturing the objective lens system 70, junction surfaces must be finished with extremely high accuracy, which results in largely increased costs.

The inventor of the present invention has already suggested an objective lens system for use within a microscope in which such a problem is solved. See Japanese Patent Laid-Open Gazette Nos. 1-319719 and 1-319720. These literature references will be hereinafter referred to as the "prior applications." FIG. 2 shows an objective lens system for use within a microscope, namely, objective lens system 60, according to an embodiment of the prior applications. The suggested objective 60 includes lenses 61 to 63, which are made of either quartz or fluorite. The lenses 61 to 63, i.e., a first to a third lenses, are displaced in that order from an object side (left-hand side in the figure) to an image formation side (right-hand side in the figure) with preselected air spaces therebetween. This enables the objective lens system 60 to be used in both ultraviolet and far ultraviolet ranges. The lenses 61 to 63, as has just been mentioned, are separated from each other; that is, the objective lens system 60 includes no junction surfaces. Thus, because no optical contact is present, the objective lens system 60 is free from the problem relating to manufacture cost.

The objective lens system 60 cooperates with an image formation lens system (detailed structure thereof will be given later) in order to form an image of an object to be observed on the focal plane of the image formation lens system at a predetermined imaging magnification M. In this case, the imaging magnification M is a ratio of the focal length $f_2$ of the image formation lens system to the focal length $f_1$ of the objective lens system 60, and is given as:

$$M = -f_2/f_1 \qquad (1)$$

In general, an objective lens system is replaced with another one while an image formation lens system is fixed, thereby the imaging magnification M is changed. Replaceable objective lens systems are therefore necessary, each of the lens systems having a focal length different from the focal length $f_1$.

The equation (1) shows that a replacement objective lens system which has a focal length of $(f_1/2)$ is necessary to double the imaging magnification M. If what is required is more than to form the other replaced objective lens system such that its focal length becomes $(f_1/2)$, the needed objective lens system merely has to have a size of a proportionally reduced objective lens system 60.

However, if the objective lens system 60 is replaced with the needed objective lens system for replacement mentioned above (which is equal to the objective lens system 60 halved in terms of size), the distance between the needed objective lens system and the object to be observed would have to be also halved as long as the pupil of a microscope objective lens is fixed. This is extremely time-consuming as well as labor-consuming in that the microscope must be brought into focus once again all from the beginning after the replacement, and this therefore, enormously adversely affects the operation of the microscope. In addition, such replacement causes halving of the pupil size, which in turn causes a remarkable change in quantity of light illuminating onto the object. On the other hand, if the position of the object is fixed, the objective lens should be moved, so that the position of the pupil would be moved. This should also be avoided in a fixed illumination system for illuminating the object, since positional changes of the pupil exerts unfavorable affect upon the illumination conditions.

Thus, when imaging magnification is to be doubled by replacing objective lens systems, an objective lens system for replacement must have:

(a) a focal length half that of the objective lens system 60;

(b) parfocality; that the, property of eliminating the necessity of bringing a microscope into focus once again after replacement; and (c) a pupil which has roughly the same size as of the objective lens system 60.

SUMMARY OF THE INVENTION

The present invention is directed to an objective lens system for a microscope. The system includes: a first lens made of quartz, the first lens having a negative power; a second lens made of either quartz or fluorite, the second lens having a positive power; a third lens made of quartz, the third lens having a negative power; a fourth lens made of fluorite, the fourth lens having a positive power; a fifth lens made of quartz, the fifth lens having a negative power; and a sixth lens made of fluorite, the sixth lens having a positive power, wherein the first to the sixth lenses are disposed in that order from an object side to an image formation side with predetermined air spacing therebetween.

The present invention is also directed to an objective lens system for use within a microscope. The system includes: a first lens being a meniscus lens made of either quartz or fluorite, the first lens having a concave surface directed toward an object; a second lens being a meniscus lens made of quartz, the second lens having a convex surface directed toward the object, the second lens having a negative power; a third and a fifth lenses made of fluorite, the third and the fifth lens having a positive power; and a fourth lens made of quartz, the fourth lens having a negative power, wherein the first to the fifth lenses are disposed in that order from an object side to an image formation side with predetermined air spacings therebetween.

The present invention also relates to an apparatus for measuring the thickness of a film on a sample, the apparatus including: means for illuminating the sample, and a microscopic optical system for imaging ultraviolet and/or far ultraviolet light from the sample, the microscopic optical system including an objective lens system for converging the light in an image formation direction.

An object of the present invention is to provide an inexpensive objective lens system for use within a microscope which is employable in ultraviolet and/or far ultraviolet range and which is different in structure from the objective lens system according to the precedent applications.

Another object of the present invention is to provide an objective lens system for use within a microscope which has a focal length approximately half, parfocality, and a pupil roughly the same as those of the objective lens system of the precedent applications which forms an image on a focal plane of an image formation lens system at a predetermined imaging magnification when cooperates with the image formation lens system.

Another object of the present invention is to provide an apparatus which uses ultraviolet and/or far ultraviolet light to accurately measure the thickness of a film which is formed on a sample.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 5A, 5B, 5C and 5D illustrate spherical aberration, sine condition, astigmatism and distortion of an optical system utilizing the image formation lens system of FIG. 4 and the objective lens system of FIG. 3, respectively;

FIGS. 7A, 7B, 7C and 7D illustrate spherical aberration, sine condition, astigmatism and distortion of an optical system utilizing the image formation lens system of FIG. 4 and the objective lens system of FIG. 6, respectively;

FIGS. 9A, 9B, 9C and 9D illustrate spherical aberration, sine condition, astigmatism and distortion of an optical system utilizing the image formation lens system of FIG. 4 and the objective lens system of FIG. 8, respectively;

FIGS. 11A, 11B, 11C and 11D illustrate spherical aberration, sine condition, astigmatism and distortion of an optical system utilizing the image formation lens system of FIG. 4 and the objective lens system of FIG. 10, respectively;

FIG. 13 is a flow chart showing a method of measuring film thickness by system of FIG. 12.

DESCRIPTION OF THE PREFERRED EMBODIMENTS

A. First Embodiment

Figure 1:
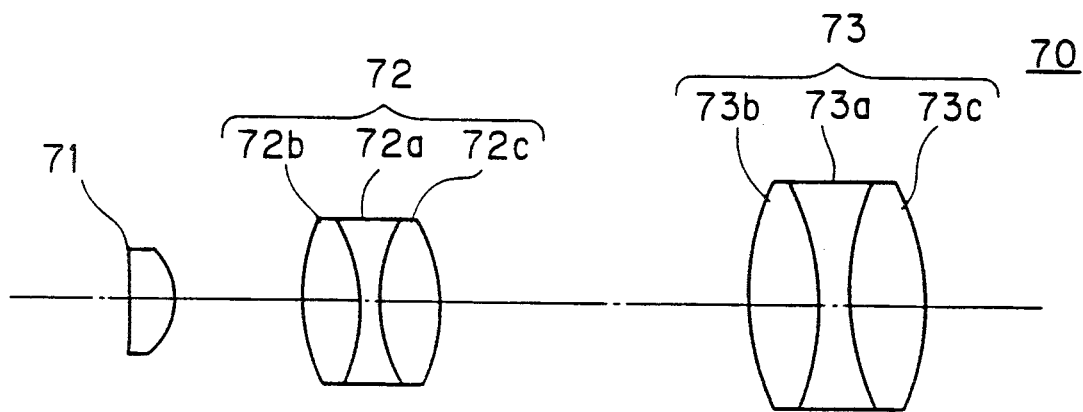
FIGS. 1 and 2 are block diagrams of a conventional objective lens system for use within a microscope.

An objective lens system according to a first embodiment of the present invention includes a first to a sixth lens displaced in that order from an object side to an image formation side with predetermined air spaces therebetween. The first lens is made of quartz and has a negative power. The second lens is made of either quartz or fluorite and has a positive power. The third lens is made of quartz and has a negative power. The fourth lens is made of fluorite and has a positive power. The fifth lens is made of quartz and has a negative power. The sixth lens is made of fluorite and has a positive power. In short, the first, the third and the fifth lenses are made of quartz, whereas the second, the fourth and the sixth lenses are made of fluorite, while the second lens is made of either quartz or fluorite. This enables the objective lens system to transmit ultraviolet and/or far ultraviolet light, and hence to be employed in the ultraviolet and/or ultraviolet range.

In addition to this, the first to the sixth lenses are separated from each other by a predetermined air space; that is, the objective lens system needs no optical contact. This provides a large reduction in cost for the objective lens system.

Further, the second, the fourth and the sixth lenses have a positive power, whereas the first, the third and the fifth lenses have a negative power. This enables corrections of aberrations such as spherical and chromatic aberrations.

Aberrations can be further moderated especially when the objective lens system satisfies the following inequities:

$$|\phi_2/\phi_1| < 0.92 \quad (2)$$

$$1.1 < |\phi_4/\phi_3| < 8.8 \quad (3)$$

$$|\phi_6/\phi_5| < 0.85 \quad (4)$$

where the powers of the first, the second, the third, the fourth, the fifth and the sixth lenses are $\phi_1$, $\phi_2$, $\phi_3$, $\phi_4$, $\phi_5$ and $\phi_6$, respectively.

This is firstly because aberrations can not be corrected inadequately (i.e., undercorrected) when an absolute value $|\phi_2/\phi_1|$ is not less than 0.92.

Secondly, when an absolute value $|\phi_4/\phi_3|$ is not more than 1.1, aberrations are excessively corrected (i.e., overcorrected), whereas aberrations are inadequately corrected (undercorrected) when the value is not less 8.8.

Further, this is because an absolute value $|\phi_6/\phi_5|$ of 0.85 or more results in inadequate correction (undercorrected).

The objective lens system according to the first embodiment is interchangeable with other objective lens system, according to the precedent applications, for forming an image by cooperating with an image formation lens system. The objective lens system includes three lens groups consisting of a concave and a convex lens. Each of the three lens groups will be referred to as a "concave-convex lens pair." Owing to this composition, the focal length of the objective lens system can be shortened to be approximately half that of the objective lens system embodied by the prior applications without causing changes in the diameter of a pupil. Thus, image magnification is doubled.

Now, taking correction of chromatic aberration into consideration in designing such an objective lens system, it is preferred that each concave-convex lens pair be formed by a lens made of quartz and the other made of fluorite. Equally desirable for the sake of the correction is that the lens pairs be individually corrected for chromatic aberration. However, the same needs not always go with the objective lens system according to the first embodiment. The reason is as follows: This objective lens system has such structure that the powers of the lenses therein are dispersed, thereby successively deflecting incident light. Hence, distances between an object and the respective concave-convex lens pairs are naturally different, so corrections of spherical aberration at the individual concave-convex lens pairs would be. In addition, beam height becomes lower toward the object side. Therefore, the concave-convex lens pair nearest the object side does not necessarily have to be formed by combination of a lens made of quartz and the other made of fluorite in order to deal with chromatic aberration, but rather it can be corrected for chromatic aberration by the existence of the other concave-convex lens pairs. In short, when the objective lens system satisfies the inequalities (2) to (4), aberrations such as spherical aberration can be further moderated, the reason being the same as given before.

The focal length of the objective lens system according to the first embodiment is an approximately half that of the objective lens system according to the prior applications. If the objective lens system according to the first embodiment is designed, in conformance with the shortened focal length, in such a manner that a distance between principal points is greater than that of the objective lens system of the prior applications, the parfocal distance of the objective lens system according to the first embodiment would coincide with that of the objective lens system of the prior applications. Since the distance between the principal points is not long, i.e., approximately one-third of the focal length, it is easy to make the objective lens system according to the first embodiment and the objective lens system according to the prior applications.

A-1. First Example

Figure 3:
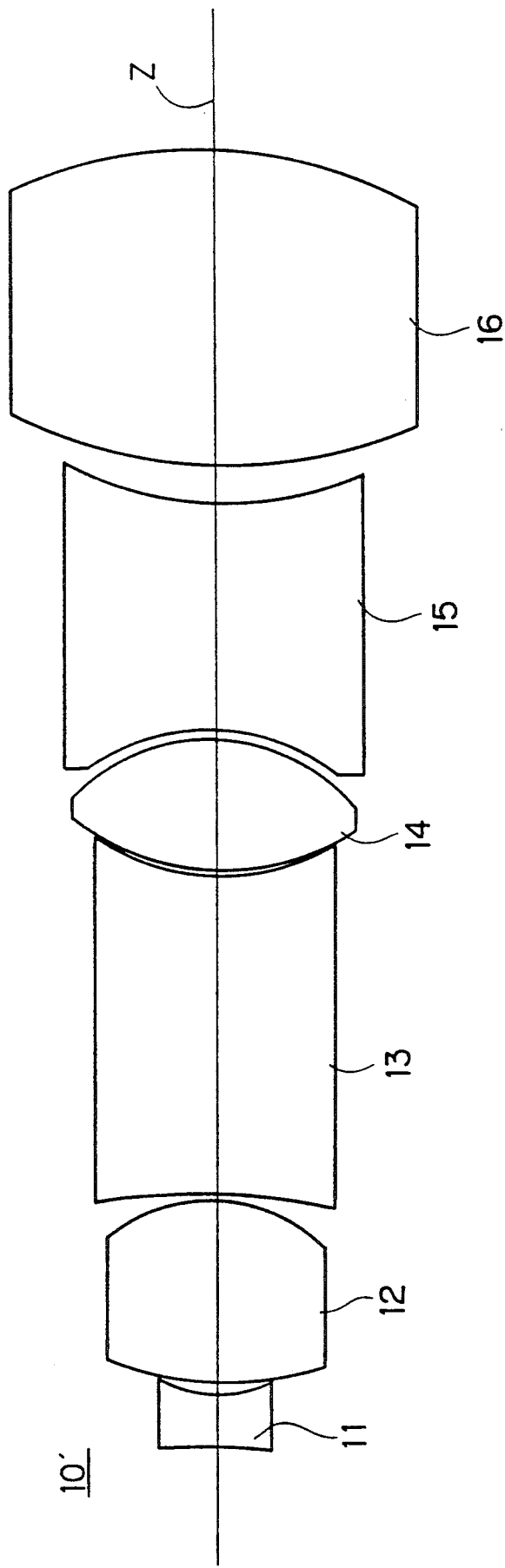
FIGS. 3 and 6 are block diagrams of an objective lens system according to a first embodiment of the present invention.

FIG. 3 is a block diagram of an objective lens system according to a preferred example of the first embodiment. In FIG. 3, an objective lens system 10 includes a first to a sixth lens 11 to 16. The first to the sixth lenses 11 to 16 are serially displaced in that order from an object side (left-hand side of the figure) to an image formation side (right-hand side of the figure) with predetermined air spaces therebetween. The first, the third and the fifth lenses 11, 13 and 15 have a negative power, whereas the second, the fourth and the sixth lenses 12, 14 and 16 have a positive power.

The following table 1 shows lens data of the objective lens system 10:

TABLE 1

| i | radius of curvature $r_i$ | surface-to-surface distance $d_i$ | material |
|---|---|---|---|
| 1 | −12.156 | 0.90 | quartz |
| 2 | 2.010 | 0.13 | |
| 3 | 4.630 | 2.90 | quartz |
| 4 | −2.500 | 0.10 | |
| 5 | −8.640 | 5.00 | quartz |
| 6 | 3.578 | 0.10 | |
| 7 | 4.168 | 2.10 | fluorite |
| 8 | −2.855 | 0.10 | |
| 9 | −3.272 | 3.60 | quartz |
| 10 | 5.870 | 0.55 | |
| 11 | 7.400 | 5.00 | fluorite |
| 12 | −7.425 | | |

In Table 1, the symbol $r_i$ represents the radius of curvature of an i-th lens surface from the object side (left-hand side in the figure), and the symbol $d_i$ represents a distance between an i-th lens surface and an (i+1)-th lens surface along an optical axis Z, where the subscript i is an integer from one to twelve. These symbols also apply to Table 3 presented later. As will be understood from the Table 1, the first to the third lenses 11 to 13 and the fifth lens 15 are all made of quartz, while the fourth and the sixth lenses 14 and 16 are made of fluorite.

The focal length f, the numerical aperture (NA) and the image size of the objective lens system 10 are 15, 1/6 and 10.8, respectively.

The powers of the first to the sixth lenses at light of a wavelength of 298.06 nm are:

$$\phi_1 = -0.2890, \quad \phi_2 = 0.2607$$
$$\phi_3 = -0.2189, \quad \phi_4 = 0.2431$$
$$\phi_5 = -0.2625, \quad \phi_6 = 0.1097$$

where the powers of the first, the second, the third, the fourth, the fifth and the sixth lenses are $\phi_1$, $\phi_2$, $\phi_3$, $\phi_4$, $\phi_5$ and $\phi_6$, respectively.

Then, $$|\phi_2/\phi_1| = 0.902$$

$$|\phi_4/\phi_3| = 1.111$$

$$|\phi_6/\phi_5| = 0.418$$

Thus, the objective lens system 10 obviously satisfies the inequalities (2) to (4).

Figure 4:
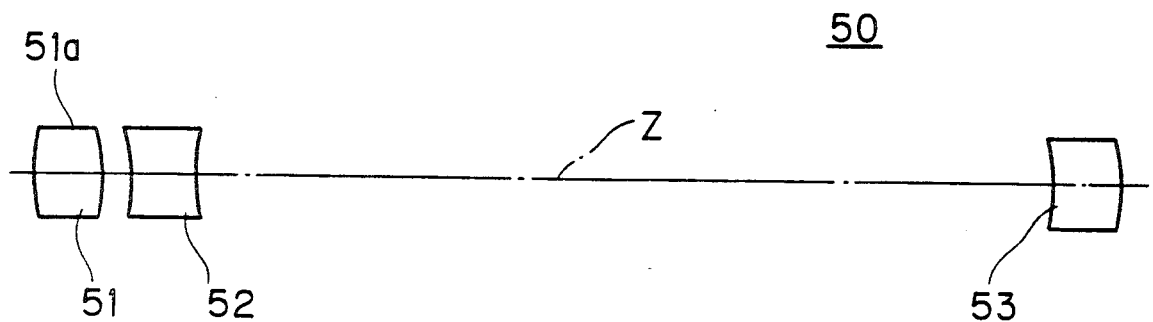
FIG. 4 is a block diagram of an image formation lens system.

The objective lens system 10 is designed as a so-called infinity corrected objective system so as to be in use within a reflecting type microscope. That is, the objective lens system 10, when used in combination with an image formation lens system, forms an image of an object on the focal plane of the image formation lens system. The image formation lens system is described in the following:

FIG. 4 is a block diagram of the image formation lens system, the image formation lens system being identical to the one disclosed in the prior applications, namely, Japanese Patent Laid-Open Gazette Nos. 1-319719 and 1-319720. In FIG. 4, an image formation lens system 50 includes a first to a third lens 51 to 53. The first, the second and the third lenses 51, 52 and 53 are displaced in that order from an object side (left-hand side of FIG. 4) to an image formation side (right-hand side of FIG. 4) with predetermined air spaces therebetween.

Table 2 below shows data of the image formation lens system 50.

TABLE 2

| i | radius of curvature $R_i$ | surface-to-surface distance $D_i$ | material |
|---|---|---|---|
| 1 | 23.000 | 7.00 | fluorite |
| 2 | −31.540 | 2.75 | |
| 3 | −23.180 | 7.00 | quartz |
| 4 | 33.710 | 86.40 | |
| 5 | −10.530 | 7.00 | quartz |
| 6 | −13.488 | | |

In Table 2, the symbol $R_i$ represents the radius of curvature of an i-th lens surface from the object side (left-hand side in the figure), and the symbol $D_i$ represents a distance between the i-th lens surface and an (i+1)-th lens surface along an optical axis Z. As will be understood from the Table 2, the first lens 51 is made of fluorite, the second and the third lenses 52 and 53 are both made of quartz. The focal length f' of the image formation lens system 50 is 300.

Hence, the equality below gives the imaging magnification M of a microscope utilizing the image formation lens system 50 and the objective lens system 10.

$$M = -f'/f = -300/15 = -20.0$$

FIGS. 5A and 5B illustrate spherical aberration and sine condition, respectively, caused in the optical system formed by the image formation lens system 50 and the objective lens system 10. In FIGS. 5A and 5B (and also in FIGS. 7A, 7B, 9A, 9B, 11A and 11B: provided later), alphabetic characters A, B, C and D show a value with respect to light of wavelengths of 298.06 nm, 202.54 nm, 398.84 nm and 253.70 nm, respectively.

FIGS. 5C and 5D illustrate astigmatism and distortion at light of a wavelength of 298.06 nm. In FIG. 5C (and in FIGS. 7C, 9C and 11C), a solid line S relates to the sagittal image field while the broken line M to the meridional image field.

FIGS. 5A and 5B clearly show that the objective lens system 10 successfully restrains aberrations at ultraviolet and far ultraviolet light. Thus, the objective lens system 10 is employable in the ultraviolet and far ultraviolet ranges. In addition, FIGS. 5C and 5D show that serious astigmatism and distortion do not occur in the optical system utilizing the objective lens system 10.

A-2. Second Example

Figure 6:
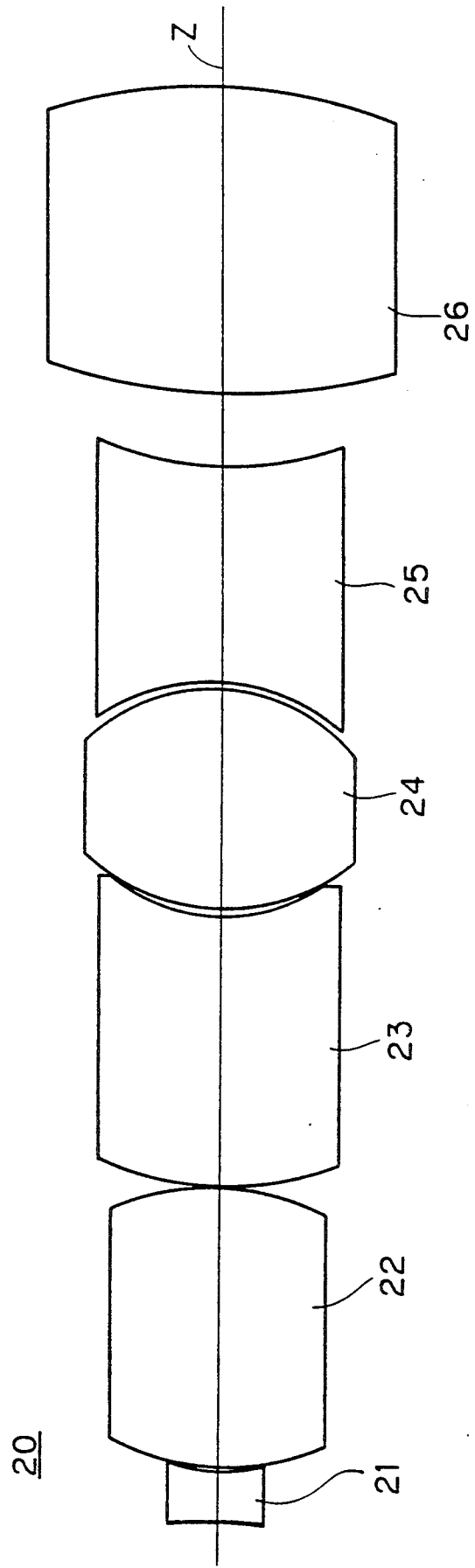

FIG. 6 is a block diagram of an objective lens system according to another example of the first embodiment. An objective lens system 20 is basically identical to the objective lens system 10 in structure. That is, the objective lens system 20 includes a first to a sixth lens 21 to 26, the first to the sixth lenses being serially disposed in that order from an object side (left-hand side of the figure) to an image formation side (right-hand side of the figure) with predetermined air spaces therebetween.

Data of the objective lens system 20 are presented in Table 3.

TABLE 3

| i | radius of curvature $r_i$ | surface-to-surface distance $d_i$ | material |
|---|---|---|---|
| 1 | −5.350 | 0.90 | quartz |
| 2 | 3.422 | 0.10 | |
| 3 | 6.070 | 5.00 | fluorite |
| 4 | −6.412 | 0.10 | |
| 5 | 6.900 | 5.00 | quartz |
| 6 | 3.422 | 0.10 | |
| 7 | 3.785 | 3.95 | fluorite |
| 8 | −3.616 | 0.10 | |
| 9 | −4.030 | 4.05 | quartz |
| 10 | 7.000 | 1.35 | |
| 11 | 10.700 | 5.50 | fluorite |
| 12 | −10.710 | | |

As shown in Table 3, the first, the third and the fifth lenses 21, 23 and 25 are made of quartz, while the second, the fourth and the sixth lenses 22, 24 and 26 are made of fluorite.

The focal length f, the numerical aperture (NA) and the image size of the objective lens system 20 is 15, 1/6 and 10.8, respectively.

The powers $\phi_1$ to $\phi_6$ of the first to the sixth lenses 21 to 26 at light of a wavelength of 298.06 nm are:

$$\phi_1 = -0.2419, \quad \phi_2 = 0.1275$$
$$\phi_3 = -0.0380, \quad \phi_4 = 0.2047$$
$$\phi_5 = -0.2140, \quad \phi_6 = 0.0781$$

Then, $$|\phi_2/\phi_1| = 0.527$$

$$|\phi_4/\phi_3| = 5.388$$

$$|\phi_6/\phi_5| = 0.365$$

Hence, it is apparent that the objective lens system 20 satisfies the inequalities (2) to (4).

The objective lens system 20 is an infinity corrected objective system, similar to the objective lens system 10, and acts in combination with the image formation lens system 50. Hence, the equation below gives the imaging magnification M of a microscope utilizing the image formation lens system 50 and the objective lens system 20.

$$M = -f'/f = -300/15 = -20.0$$

FIGS. 7A and 7B illustrate spherical aberration and sine condition, respectively, in the optical system utilizing the objective lens system 20 and the image formation lens system 50, while FIGS. 7C and 7D show astigmatism and distortion at light of a wavelength of 298.06 nm.

According to FIGS. 7A and 7B, serrious aberrations at ultraviolet and far ultraviolet light do not occur in the objective lens system 20. Thus, the objective lens system 20 is obviously employable in the ultraviolet and far ultraviolet ranges. In addition, astigmatism and distortion are restrained in the optical system in which the objective lens system 20 is used (according to FIGS. 7C and 7D).

A-3. Effect of First Embodiment

The objective lens systems 10 and 20 according to the first embodiment are all employable in the ultraviolet and/or far ultraviolet ranges and display excellent properties at light of these ranges. Moreover, in the objective lens systems of the first embodiment, the first to the sixth lenses are separated from each other. This eliminates optical contact between the lenses, and hence successfully realizes cost reductions.

Though not especially described in the specification, it has been confirmed that aberrations at visible and infrared light are also effectively restrained according to the present invention. Thus, the objective lens systems 10 and 20 are employable in a very wide range, i.e., from infrared to far ultraviolet.

Figure 2:
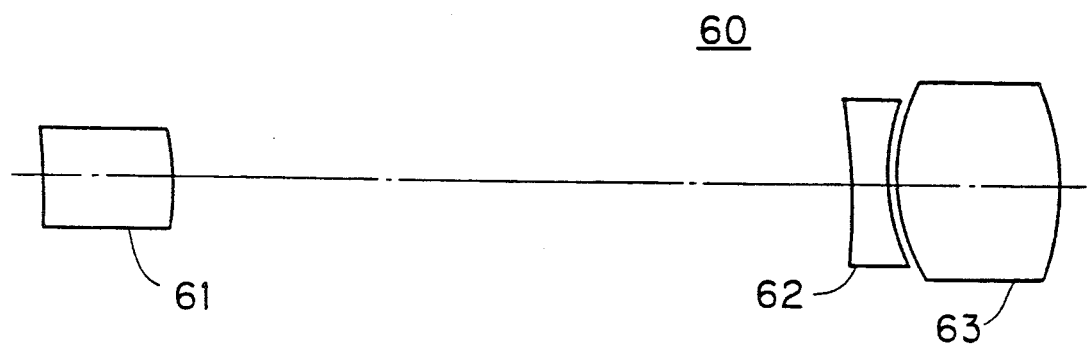

Now referring again to the prior applications, the objective lens system 60 (FIG. 2) is combined with the image formation lens system 50, thereby to obtain the imaging magnification M of −10. More precisely, the focal length of the objective lens system 60 is 30, whereas the focal length of any of the objective lens systems 10 and 20 is 15. Hence, the imaging magnification M can be varied from −10 to −20 by replacing, for instance, the objective lens system 60 with the objective lens system 10 of the first embodiment while fixing the image formation lens system 50 in the same position.

Each of the objective lens systems 10 and 20 has a parfocal relation with respect to the objective lens system 60 as set forth. This eliminates the time consuming process of bringing the microscope into focus after replacement (for example, after the objective lens system 10 has replaced the objective lens system 60), whereby operation of the microscope is greatly improved.

The objective lens systems 10 and 20 have a pupil diameter which coincides with the pupil of the objective lens system 60. In consequence, the replacement accompanies only negligible changes in quantity of illumination light incident on an object, promising fairly good observation.

B. Second Embodiment

An objective lens system according to a second embodiment of the present invention includes a first to a fifth lens displaced in that order from an object side to an image formation side with predetermined air spacings therebetween. The first lens is a meniscus lens, and has a concave surface directed toward an object. The second lens is a meniscus lens, and has a convex surface directed toward the object. The second and the fourth lenses have a negative power. The third and the fifth lenses have a positive power.

The second and the fourth lenses are made of quartz, whereas the third and the fifth lenses are made of fluorite, while the first lens is made of either quartz or fluorite. This enables the objective lens system to be able to transmit ultraviolet and/or far ultraviolet light, and hence to be employable in the ultraviolet and/or far ultraviolet ranges.

In addition, the first to fifth lenses are separated from each other by a predetermined air space; that is, the objective lens system includes no optical contact. This enables large reduction in cost for the objective lens system.

The objective lens system causes only negligible aberrations (such as spherical aberration or chromatic aberration) especially when it satisfies the following inequalities:

$$2.1 < |\phi_3/\phi_2| < 2.7 \tag{5}$$

$$0.35 < |\phi_5/\phi_4| < 0.45 \tag{6}$$

$$1.85 < |\phi_{23}/\phi| < 2.25 \tag{7}$$

$$0.63 < |\phi_{45}/\phi| < 0.69 \tag{8}$$

where the powers of the second to the fifth lenses are $\phi_2$, $\phi_3$, $\phi_4$ and $\phi_5$, a power of the composite lens system consisting of the second and the third lenses is $\phi_{23}$, a power of the composite lens system consisting of the fourth and the fifth lenses is $\phi_{45}$, and the overall power of the objective lens system is $\phi$.

This is because, firstly, aberrations are corrected inadequately (i.e., undercorrected) when an absolute value $|\phi_3/\phi_2|$ is not less than 2.7, while aberrations are corrected excessively (i.e., overcorrected) when the absolute value is not more than 2.1.

Secondly, enough correction of aberrations can not be attained (i.e., undercorrected) when an absolute value $|\phi_5/\phi_4|$ is not less than 0.45, while the corrections would be excessive (i.e., overcorrected) when the value is not more than 0.35.

The corrections would be undesirably inadequate (i.e., undercorrected) when absolute value $|\phi_{23}/\phi|$ is not less than 2.25, while the corrections would be more than what are demanded (i.e., overcorrected) when the value is not more than 1.85.

Lastly, the corrections would be undesirably inadequate (i.e., undercorrected) when absolute value $|\phi_{45}/\phi|$ is not less than 0.69, while the corrections would be more than what are demanded (i.e., overcorrected) when the value is not more than 0.63.

The objective lens system according to the second embodiment is interchangeable with another objective lens system, according to the prior applications, for forming an image by cooperating with an image formation lens system. The objective lens system is a modification of the so-called "Amici type" lens. This allows, without causing changes in the diameter of a pupil, the focal length of the objective lens system of the second embodiment to be reduced to approximately half that of the objective lens system according to the prior applications, eventually enabling imaging magnification to be doubled. Here, it is important to notice the differences between the objective lens system according to the second embodiment and an objective lens system of the Amici type; specifically, in the objective lens system of the second embodiment, the lens nearest an object (namely, the first lens) is a meniscus lens. Being a meniscus lens, the first lens possesses characteristics of not only an aplanat lens but also a field flatner, and therefore, aberrations can be corrected positively. Further, it is preferred that this meniscus lens has a negative power, especially if the object lens system is to be telecentric.

Aberrations such as spherical aberration can be further corrected when the object lens system satisfies the inequalities (5) to (8), the reason being the same as set forth before.

In addition, as described earlier, the focal length of the objective lens system according to the second embodiment is approximately half that of the objective lens system according to the prior applications. Still, the objective lens system of the second embodiment would have parfocality by designing the objective lens system according to the second embodiment, in conformance with the shortened focal length, such that it has a distance between principal points greater than that of the objective lens system according to the prior applications. The distance between principal points is not long (precisely, approximately one-third of the focal length), and therefore, it is an easy task to design the objective lens system according to the second embodiment such that it has parfocality.

B-1. Third Example

Figure 8:
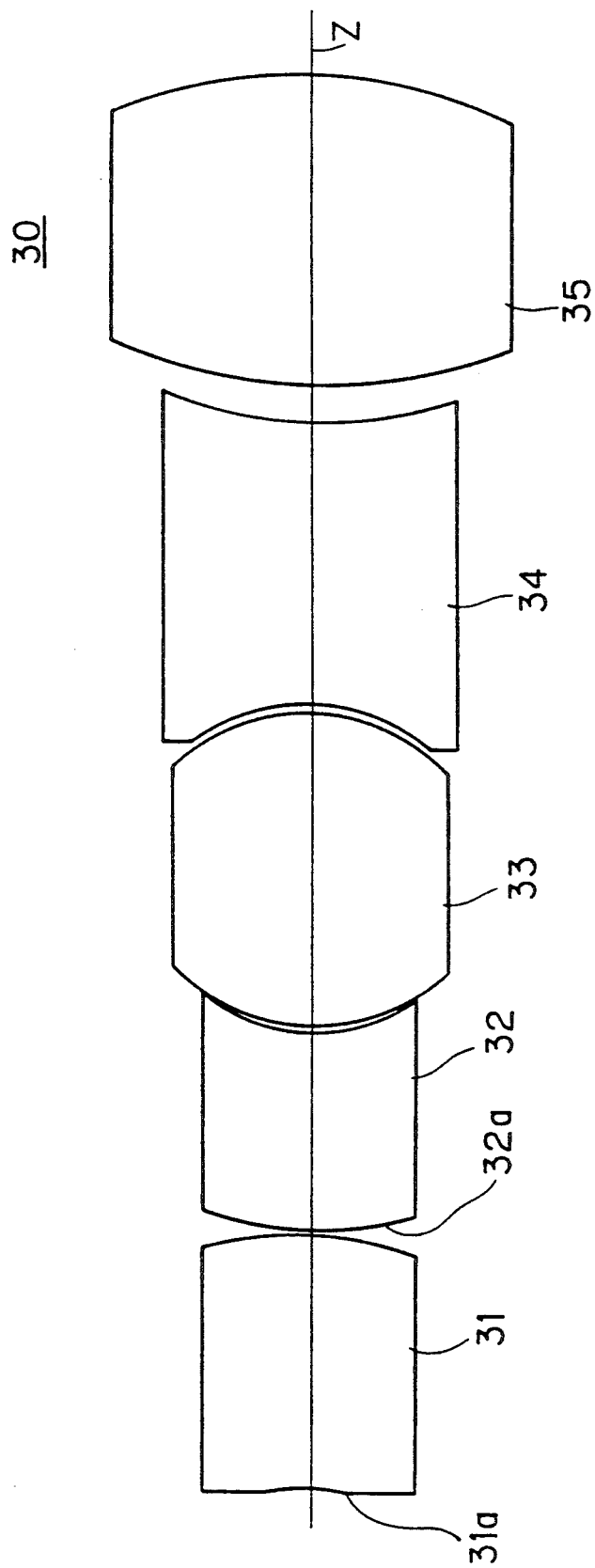
FIGS. 8 and 10 are block diagrams of an objective lens system according to a second embodiments of the present invention.

FIG. 8 is a block diagram of an objective lens system according to an example of the second embodiment. In FIG. 8, an objective lens system 30 includes a first to a fifth lens 31 to 35, displaced in that order from an object side (left-hand side of the figure) to an image formation side (right-hand side of the figure) with predetermined air spaces therebetween.

The first lens 31 is a meniscus lens and has a concave surface 31a directed toward an object. The second lens 32 is a meniscus lens, and has a convex surface 32a directed toward the object. The second and the fourth lenses 32 and 34 both have a negative power, whereas the third and the fifth lenses 33 and 35 both have a positive power.

Data of the objective lens system 30 are presented in Table 4.

TABLE 4

| i | radius of curvature $r_i$ | surface-to-surface distance $d_i$ | material |
|---|---|---|---|
| 1 | −2.918 | 4.10 | quartz |
| 2 | −5.852 | 0.10 | |
| 3 | 7.638 | 3.25 | quartz |
| 4 | 2.870 | 0.10 | |
| 5 | 3.206 | 5.00 | fluorite |
| 6 | −3.217 | 0.10 | |
| 7 | −3.500 | 4.60 | quartz |
| 8 | 6.290 | 0.65 | |
| 9 | 8.060 | 5.00 | fluorite |
| 10 | −8.300 | | |

In Table 4 (and Table 5 below), the symbol $r_i$ represents radius of curvature of an i-th lens surface from the object side (left-hand side of the figure), and the symbol $d_i$ represents a distance between an i-th lens surface and an (i+1)-th lens surface along an optical axis Z, where the subscript i is an integer from one to ten. The first, the second and the fourth lenses 31, 32 and 34 are all made of quartz, whereas the third and the fifth lenses 33 and 35 are made of fluorite.

The focal length f, the numerical aperture (NA) and the image size of the objective lens system 30 are 15, 1/6 and 10.8, respectively.

The powers of the first to the fifth lenses 31 to 35 at light of a wavelength of 298.06 nm, i.e., $\phi_1$, $\phi_2$, $\phi_3$, $\phi_4$ and $\phi_5$ are:

| | |
|---|---|
| $\phi_1 = -0.04544$, | $\phi_2 = -0.08247$ |
| $\phi_3 = 0.2142$, | $\phi_4 = -0.2507$ |
| $\phi_5 = 0.1005$ | | a symbol $\phi_{23}$ below represents a power of the composite lens system consisting of the second and the third lenses 32 and 33, while the symbol $\phi_{45}$ represents the power of a composite lens system consisting of the fourth and the fifth lenses 34 and 35. The power of the whole system (the objective lens system 30) is represented by the symbol $\phi$. The powers mentioned are:

| | |
|---|---|
| $\phi_{23} = 0.1436$, | $\phi_{45} = -0.04325$ |
| $\phi = 0.06667$ | |

Then, $|\phi_3/\phi_2| = 2.597$ $|\phi_5/\phi_4| = 0.4010$ $|\phi_{23}/\phi| = 2.154$ $|\phi_{45}/\phi| = 0.6487$ Thus, it is clear that the objective lens system 30 satisfies the inequalities (5) to (8).

In addition, the objective lens system 30 is a so-called infinity corrected objective system in order to be employable in a reflecting type microscope. The objective lens system 30 cooperates with the image formation lens system 50 of FIG. 2 to form an image of an object on the focal plane of the image formation lens system.

Hence, the following equation gives an imaging magnification M of a microscope utilizing the image formation lens system 50 and the objective lens system 30:

$$M = -f/f = -300/15 = -20.0$$

FIGS. 9A and 9B illustrate spherical aberration and sine condition of an optical system utilizing the image formation lens system 50 and the objective lens system 30. FIGS. 9C and 9D illustrate astigmatism and distortion at light of a wavelength of 298.06 nm.

FIGS. 9A and 9C show that aberrations at ultraviolet and/or far ultraviolet light are restrained in the objective lens system 30, indicating that the objective lens system 30 is employable in the ultraviolet and/or far ultraviolet ranges. In addition to this, serious astigmatism and distortion are absent in an optical system utilizing the objective lens system 30 (according to FIGS. 9C and 9D).

B-2. Fourth Example

Figure 10:
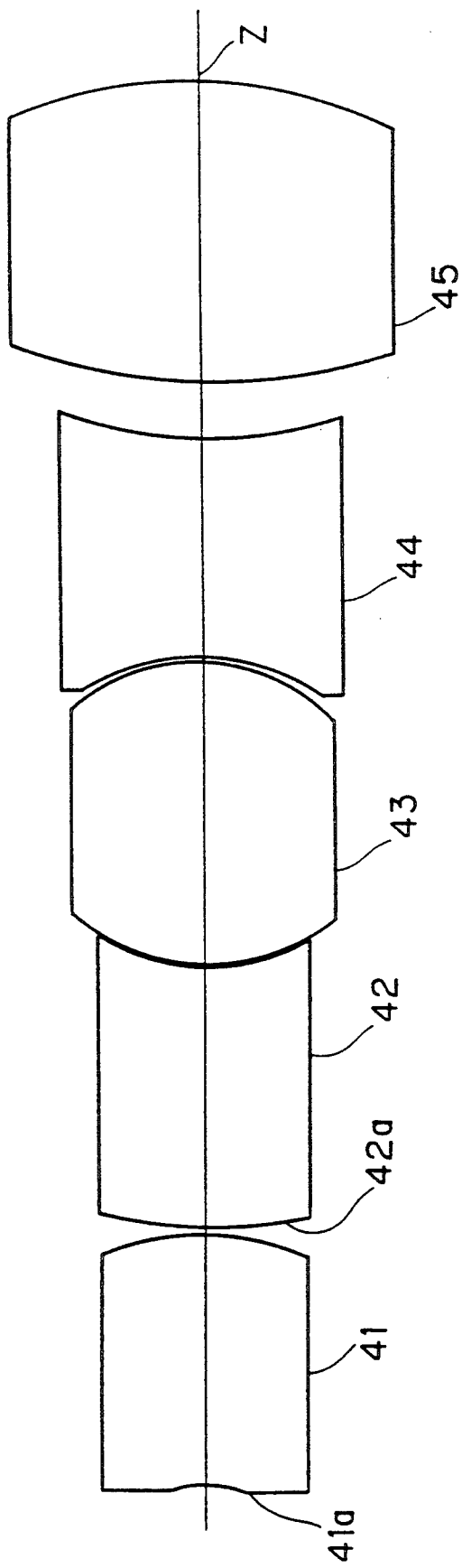

FIG. 10 is a block diagram of an objective lens system according to another example of the second embodiment. An objective lens system 40 is identical in structure to the objective lens system 30. That is, the objective lens system 40 includes a first, a second, a third, a forth and a fifth lenses 41, 42, 43, 44 and 45, which are serially displaced in that order from an object side (left-hand side of the figure) to an image formation side (right-hand side of the figure) with predetermined air spaces therebetween.

Data of the objective lens system 40 are present in Table 5.

TABLE 5

| i | radius of curvature $r_i$ | surface-to-surface distance $d_i$ | material |
|---|---|---|---|
| 1 | −2.578 | 4.25 | fluorite |
| 2 | −4.475 | 0.10 | |
| 3 | 9.955 | 4.40 | quartz |
| 4 | 2.988 | 0.10 | |
| 5 | 3.333 | 5.00 | fluorite |
| 6 | −3.392 | 0.10 | |
| 7 | −3.825 | 3.70 | quartz |
| 8 | 6.910 | 1.00 | |
| 9 | 9.823 | 5.00 | fluorite |
| 10 | −8.885 | | |

As shown in Table 5, the second and the fourth lenses 42 and 44 are both made of quartz, while the first, the third and the fifth lenses 41, 43 and 45 are all made of fluorite.

The focal lenght f, the numerical aperture (NA) and the image size of the objective lens system 40 are 15, 1/6 and 10.8, respectively.

The powers of the second to the fifth lenses 41 to 45 at light of a wavelength of 298.06 nm, i.e., $\phi_1$, $\phi_2$, $\phi_3$, $\phi_4$ and $\phi_5$, are as follows:

$\phi_1 = -0.02242$, $\phi_2 = -0.09068$
$\phi_3 = 0.2075$, $\phi_4 = -0.2208$
$\phi_5 = 0.08927$ The symbol $\phi_{23}$ below represents a power of the composite lens system consisting of the second and the third lenses 42 and 43, while the symbol $\phi_{45}$ represents the power of a composite lens system consisting of the fourth and the fifth lenses 44 and 45. The power of the whole system (namely, the objective lens system 40) is represented by the symbol $\phi$. The powers mentioned are:

$\phi_{23} = 0.1304$, $\phi_{45} = -0.04466$
$\phi = 0.06667$

Then, $|\phi_3/\phi_2| = 2.288$ $|\phi_5/\phi_4| = 0.4043$ $|\phi_{23}/\phi| = 1.956$ $|\phi_{45}/\phi| = 0.6699$ Thus, the objective lens system 40 obviously satisfies the inequalities (5) to (8).

In addition, the objective lens system 40 is, similarly to the objective lens system 30, designed as a so-called infinity corrected objective system, and is to be used in combination with the image formation lens system 50. Hence, the following equation gives the imaging magnification M of a microscope utilizing the image formation lens system 50 and the objective lens system 40:

$$M = -f'/f = -300/15 = -20.0$$

FIGS. 11A and 11B illustrate spherical aberration and sine condition of an optical system utilizing the image formation lens system 50 and the objective lens system 40, while FIGS. 11C and 11D illustrate astigmatism and distortion at light of a wavelength of 298.06 nm.

FIGS. 11A and 11B show that aberrations at ultraviolet and/or far ultraviolet light are restrained in the objective lens system 40. Thus, the objective lens system 40 is employable in the ultraviolet and/or far ultraviolet ranges. In addition, the objective lens system 40 is also free from serious astigmatism or distortion aberration (according to FIGS. 11C and 11D).

B-3. Effect of Second Embodiment

The objective lens systems 30 and 40 according to the second embodiment are all employable in the ultraviolet and/or far ultraviolet ranges and display excellent properties at light of these ranges. In the objective lens systems of the second embodiment, the first to the fifth lenses are separated from each other. This eliminates optical contact between the lenses, and hence would successfully lead to cost reduction.

Though not especially described in the specification, it has been confirmed that aberrations at visible and infrared light are also effectively restrained according to the present invention. Thus, the objective lens systems 30 and 40 are employable in a very wide range, i.e., from infrared to far ultraviolet.

The focal length of the objective lens system 60 is 30, whereas the focal length of any of the objective lens systems 30 and 40 is 15. Hence, the imaging magnification M can be varied from −10 to −20 by replacing while fixing the image formation lens system 50 in the same position.

Each of the objective lens systems 30 and 40 has a parfocal relation to the focal point of the objective lens system 60 as set forth. This eliminates time consuming process of bringing the microscope into focus after replacement, whereby operation of the microscope would be greatly improved.

The objective lens systems 30 and 40 have a pupil a diameter of which coincides with the pupil of the objective lens system 60. In consequence, the replacement accompanies only negligible changes in quantity of illumination light incident on an object, promising fairly good observation.

C. System for Measuring Film Thickness

Figure 12:
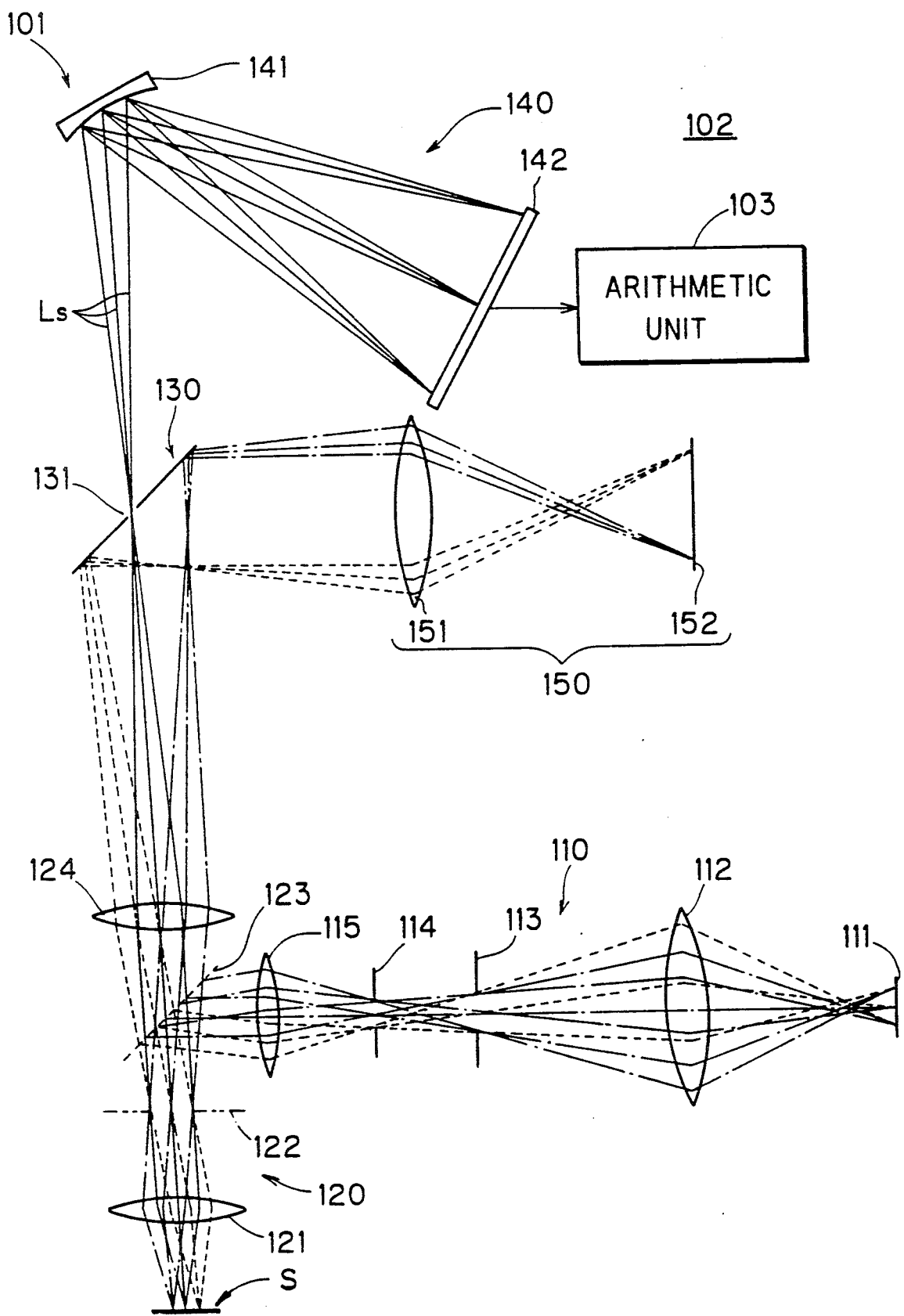
FIG. 12 is a schematic block diagram of a system for measuring film thickness.

FIG. 12 is a schematic block diagram of a system 102 for measuring film thickness. The system 102 includes a microspectroscope 101 for detecting the spectrum of a sample to be measured and an arithmetic unit 103 for calculating the film thickness of the measured sample S on the basis of spectral data obtained by the microspectroscope 101. The microspectroscope 101 includes an illuminating optical system 110, a microscopic optical system 120, a reflecting mirror 130, a spectroscopic unit 140, and a monitoring optical system 150.

The illuminating optical system 110 includes a light source 111 for projecting light which includes ultraviolet and far ultraviolet rays, a condenser lens 112, an aperture stop 113, a field stop 114 and another condenser lens 115. Thus, illuminating light from the light source 111 is guided to the microscopic optical system 120 through the condenser lens 112, the aperture stop 113, the field stop 114 and the condenser lens 115.

The microscopic optical system 120 includes an objective lens system 121 which is identical to that shown in FIG. 3, an image formation lens system 124 which is identical to that shown in FIG. 4 and a beam splitter 123 provided between the objective lens 121 and the image formation lens system 124. Symbol 122 denotes a pupil position of the objective lens system 121.

The illuminating light from the light source 111 passes through the condenser lens 112, the aperture stop 113, the field stop 114 and the condenser lens 115, and is guided to the objective lens system 121 by the beam splitter 123. The illuminating light is through the objective lens system 121 and is applied onto the surface of a measured sample S. The sample S is supported by a sample holder (not shown).

Reflected light from the surface of the measured sample S is enlarged by the lenses 121 and 124, and is imaged at a position close to the reflecting mirror 130.

The reflecting mirror 130 is provided with a pinhole 131. Reflected light $L_S$ passing through the pinhole 131 enters the spectroscopic unit 140.

The spectroscopic unit 140 is formed by a diffraction grating 141 for separating the reflected light $L_S$ into spectral components and a photo detector 142 for detecting the spectrum of the spectrally diffracted light. The diffraction grating 141 may be prepared by a flat field type diffraction grating which images a spectrum on a flat plane. Alternatively, the diffraction grating may have a sweeper. The photo detector 142, which is formed by a photodiode array or a CCD, for example, is conjugate with the pinhole 131. Alternatively, the photo detector 142 may include a photomultiplier.

Since the spectroscopic unit 140 has the aforementioned structure, the reflected light $L_S$ is separated into its spectral components by the diffraction grating 141, and the respective spectral components are received by the photo detector 142, which in turn outputs a signal corresponding to the spectrum of the light $L_S$.

The light reflected by the reflecting mirror 130 enters the monitoring optical system 150, and is imaged at an image-formation position 152 through a relay lens 151. Thus, an enlarged image of the surface of the sample S is imaged on an image-formation plane, so that the measuring position of the sample S can be confirmed and focusing can be performed on the basis of the enlarged image.

FIG. 13 is a flow chart of a method of measuring film thickness. Prior to using the measuring system 102, an operator inputs spectrum data B(λ) of a sample (hereinafter referred to as "standard sample"), whose spectrum data is known, in the arithmetic unit 103 through a keyboard (not shown), to store the data in a memory (not shown) provided in the arithmetic unit 103. The standard sample may be prepared by a silicon substrate, a substrate which is deposited with aluminum on its surface, or the like.

Then the operator sets the standard sample on the sample holder of the microspectroscope 101 (step S1), and supplies a command for detecting calibration data to the arithmetic unit 103. In response to a command from the arithmetic unit 103, the microspectroscope 101 detects the spectrum of the standard sample, to store data B'(λ) relating to the spectrum in the memory of the arithmetic unit 103 (step S2).

Then, the operator removes the standard sample from the microspectroscope 101 and sets the measured sample S on the sample holder (step S3). Thereafter, the operator supplies a command to the arithmetic unit 103 to start measurement, so that the microspectroscope 101 detects the spectrum of the measured sample S in response to a command from the arithmetic unit 103, to store data S'(λ) relating to the spectrum thereof in the memory of the arithmetic unit 103 (step S4).

The data S'(λ), B(λ) and B'(λ) stored in the memory are read (step S5) into the arithmetic unit 103, to obtain data S(λ) in accordance with the following expression:

$$S(\lambda) = \frac{B(\lambda)}{B'(\lambda)} \cdot S'(\lambda) \qquad (9)$$

The data S(λ) corresponds to a signal from the microspectroscope 101 on the assumption that absolutely no influence is caused by factors such as spectral transmittance characteristics of the illuminating optical system 110 and the microscopic optical system 120. In other words, the data S(λ) shows the true spectrum of the measured sample S.

On the basis of the data S(λ) obtained during step S5, the arithmetic unit 103 calculates the thickness of the thin film (step S6). The principle of calculation of film thickness is well known in the art, and hence description thereof is omitted.

As understood from the expression (9), the data S'(λ) relating to the actually measured spectrum is calibrated in the aforementioned manner to obtain the data S(λ) relating to the true spectrum, whereby the film thickness can be accurately measured.

The present invention can be employed within a system for measuring film thickness. The invention has general applications as an objective lens optical system.

Although the present invention has been described and illustrated in detail, it is clearly to be understood that the same is by way of illustration and example only and is not to be taken by way of limitation. The spirit and scope of the present invention should be limited only by the terms of the appended claims.

What is claimed is:

1. An objective lens system for a microscope, comprising:
    a first lens made of quartz, said first lens having a negative power;
    a second lens made of either quartz or fluorite, said second lens having a positive power;
    a third lens made of quartz, said third lens having a negative power;
    a fourth lens made of fluorite, said fourth lens having a positive power;
    a fifth lens made of quartz, said fifth lens having a negative power; and
    a sixth lens made of fluorite, said sixth lens having a positive power,
    wherein said first to said sixth lenses are disposed in that order from an object side to an image formation side with predetermined air spacings therebetween.

2. An objective lens system according to claim 1, wherein the following inequalities are satisfied:

$|\phi_2/\phi_1| < 0.92$ $1.1 < |\phi_4/\phi_3| < 8.8$ $|\phi_6/\phi_5| < 0.85$ where said powers of said first, said second, said third, said fourth, said fifth and said sixth lenses are $\phi_1$, $\phi_2$, $\phi_3$, $\phi_4$, $\phi_5$ and $\phi_6$, respectively.

3. An objective lens system for a microscope, the objective lense system being interchangeable with another objective lens system for forming an image at a predetermined image magnification in cooperation with an image formation lens system, the objective lens system being able to provide roughly double image magnification when the same cooperates with said image formation lens system in place of said another objective lens system, said objective lens system comprising:
   a first lens made of quartz, said first lens having a negative power;
   a second lens made of either quartz or fluorite, said second lens having a positive power;
   a third lens made of quartz, said third lens having a negative power;
   a fourth lens made of fluorite, said fourth lens having a positive power;
   a fifth lens made of quartz, said fifth lens having a negative power; and
   a sixth lens made of fluorite, said sixth lens having a positive power,
   wherein said first to said sixth lenses are disposed in that order from an object side to an image formation side with predetermined air spacing therebetween,
   and wherein the following inequalities are satisfied:
   $|\phi_2/\phi_1| < 0.92$ $1.1 < |\phi_4/\phi_3| < 8.8$ $|\phi_6/\phi_5| < 0.85$ wherein said powers of said first, said second, said third, said fourth, said fifth and said sixth lenses are $\phi_1$, $\phi_2$, $\phi_3$, $\phi_4$, $\phi_5$, and $\phi_6$, respectively.

4. An objective lens system for a microscope, comprising:
   a first meniscus lens made of either quartz or fluorite, said first lens having a concave surface directed toward an object;
   a second meniscus lens made of quartz, said second lens having a convex surface directed toward said object, said second lens having a negative power;
   a third and a fifth lens made of fluorite, said third and said fifth lens having a positive power; and
   a fourth lens made of quartz, said fourth lens having a negative power,
   wherein said first to said fifth lenses are disposed in that order from an object side to an image formation side with predetermined air spacings therebetween.

5. An objective lens system for a microscope according to claim 4,
   wherein said first lens has a negative power.

6. An objective lens system for a microscope according to claim 4,
   wherein the following inequalities are satisfied:

$2.1 < |\phi_3/\phi_2| < 2.7$ $0.35 < |\phi_5/\phi_4| < 0.45$ $1.85 < |\phi_{23}/\phi| < 2.25$ $0.63 < |\phi_{45}/\phi| < 0.69$ where the powers of said second lens, said third lens, said fourth lens and said fifth lens are $\phi_2$, $\phi_3$, $\phi_4$ and $\phi_5$, the power of a composite lenses system consisting of said second and said third lenses is $\phi_{23}$, the power of a composite lens system consisting of said fourth and said fifth lenses is $\phi_{45}$, and a power of the objective lens system is $\phi$.

7. An objective lens system for a microscope, said objective lens system being interchangeable with another objective lens system for forming an image at a predetermined imaging magnification in cooperation with an image formation lens system, said objective lens system being able to provide roughly double image magnification when the same cooperates with said image formation lens system in place of said another objective lens system, said objective lens system comprising:
   a first meniscus lens made of either quartz or fluorite, said first lens having a concave surface directed toward an object;
   a second meniscus lens made of quartz, said second lens having a convex surface directed toward said object, said second lens having a negative power;
   a third and a fifth lens made of fluorite, said third and said fifth lens having a positive power; and
   a fourth lens made of quartz, said fourth lens having a negative power;
   wherein said first to said fifth lenses are disposed in that order from an object side to an image formation side with predetermined air spacings therebetween,
   and wherein the following inequalities are satisfied:

$2.1 < |\phi_3/\phi_2| < 2.7$ $0.35 < |\phi_5/\phi_4| < 0.45$ $1.85 < |\phi_{23}/\phi| < 2.25$ $0.63 < |\phi_{45}/\phi| < 0.69$ where the powers of said second, said third, said fourth and said fifth lenses are respectively $\phi_2$, $\phi_3$, $\phi_4$ and $\phi_5$, the power of a composite lens system consisting of said second and said third lenses is $\phi_{23}$, the power of a composite lens system consisting of said fourth and said fifth lenses is $\phi_{45}$, and the power of the objective lens system is $\phi$.

8. An apparatus for measuring the thickness of a film on a sample, said apparatus comprising:
   means for illuminating a sample; and
   a microscopic optical system for imaging ultraviolet and/or far ultraviolet light from said sample, said microscopic optical system including an objective lens system for converging said light in an image formation direction, said objective lens system including:
   a first lens made of quartz, said first lens having a negative power; a second lens made of either quartz or fluorite, said second lens having a positive power; a third lens made of quartz, said third lens having a negative power; a fourth lens made of fluorite, said fourth lens having a positive power, a fifth lens made of quartz, said fifth lens having a negative power; and a sixth lens made of fluorite, said sixth lens having a positive power, wherein said first to said sixth lenses are disposed in that order from an object side to an image formation side with predetermined air spacings therebetween, and wherein the following inequalities are satisfied:

$$|\phi_2/\phi_1| < 0.92$$

$$1.1 < |\phi_4/\phi_3| < 8.8$$

$$|\phi_6/\phi_5| < 0.85$$

where said powers of said first, said second, said third, said fourth, said fifth and said sixth lenses are $\phi_1$, $\phi_2$, $\phi_3$, $\phi_4$, $\phi_5$ and $\phi_6$, respectively.

9. An apparatus for measuring the thickness of a film on a sample, said apparatus comprising:
   means for illuminating a sample; and
   a microscopic optical system for imaging ultraviolet and/or far ultraviolet light from said sample, said microscopic optical system including an objective lens system for converging said light in an image formation direction, said objective lens system including:
   a first meniscus lens made of either quartz or fluorite, said first lens having a concave surface directed toward an object; a second meniscus lens made of quartz, said second lens having a convex surface directed toward said object, said second lens having a negative power; a third and a fifth lens made of fluorite, said third and said fifth lens having a positive power; and a fourth lens made of quartz, said fourth lens having a negative power, wherein said first to said fifth lenses are disposed in that order from an object side to an image formation side with predetermined air spacings therebetween, and wherein the following inequalities are satisfied:

$$2.1 < |\phi_3/\phi_2| < 2.7$$

$$0.35 < |\phi_5/\phi_4| < 0.45$$

$$1.85 < |\phi_{23}/\phi| < 2.25$$

$$0.63 < |\phi_{45}/\phi| < 0.69$$

where the powers of said second, said third, said fourth and said fifth lenses are respectively $\phi_2$, $\phi_3$, $\phi_4$ and $\phi_5$, the power of a composite lens system consisting of said second and said third lenses is $\phi_{23}$, the power of a composite lens system consisting of said fourth and said fifth lenses is $\phi_{45}$, and the power of the objective lens system is $\phi$.

* * * * *